No. 857,091. PATENTED JUNE 18, 1907.
J. N. B. MOORE.
WHEEL FOR CYCLES, MOTOR CARS, CARRIAGES, AND OTHER VEHICLES.
APPLICATION FILED DEC. 21, 1905.
2 SHEETS—SHEET 1.
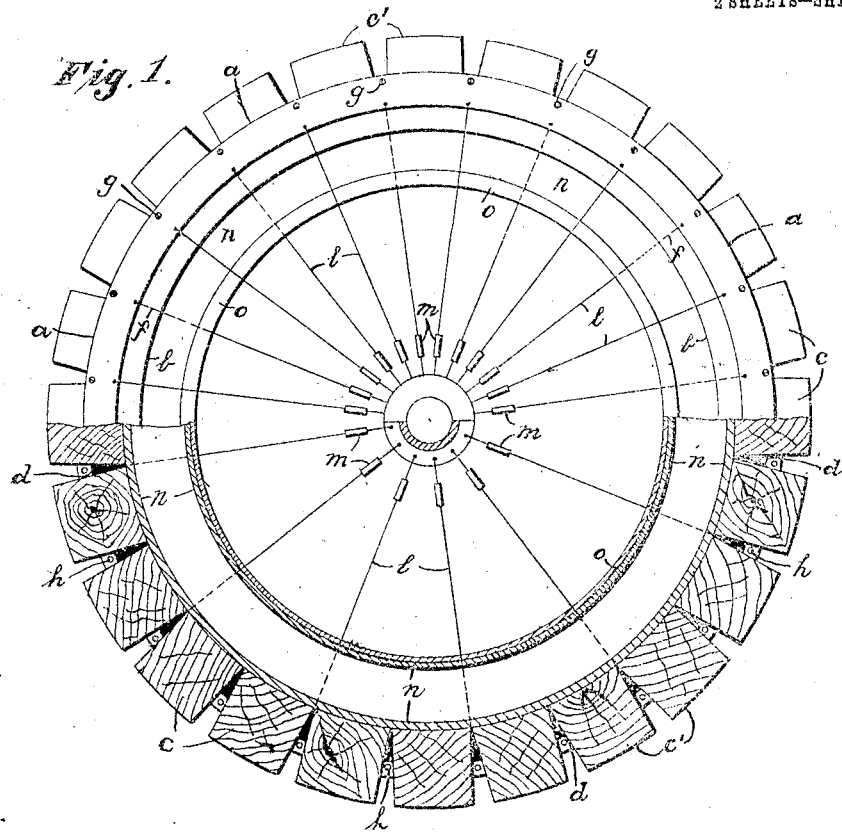
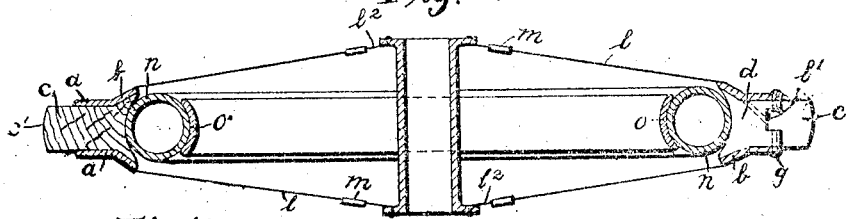
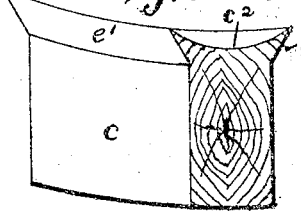 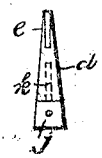 
WITNESSES:
Edwd L. Tolson
L. B. Middleton
INVENTOR,
Jno Newton Balfour Moore
by Richards & Co. att.

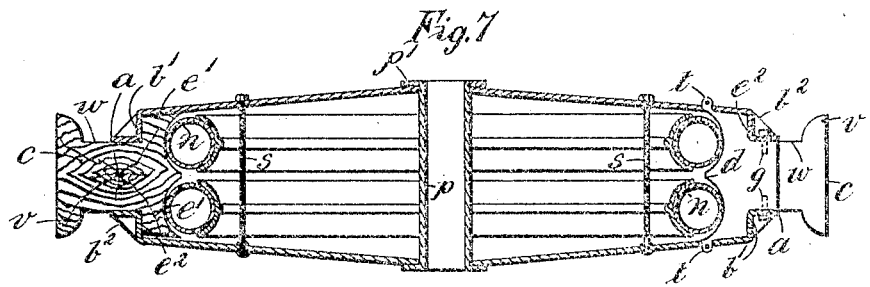
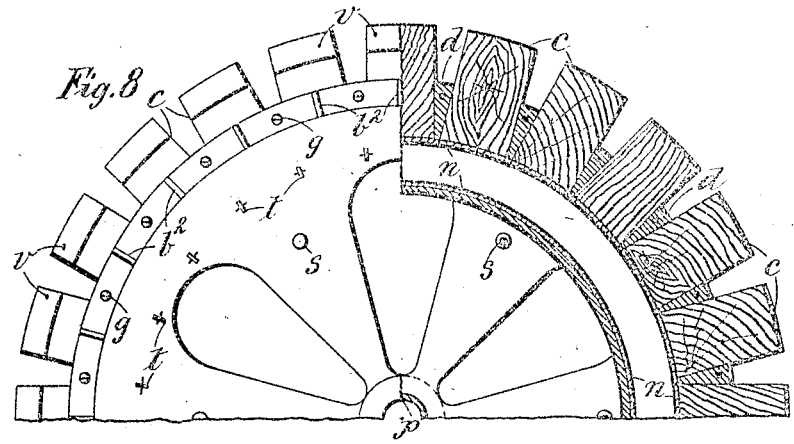
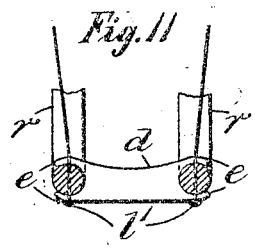 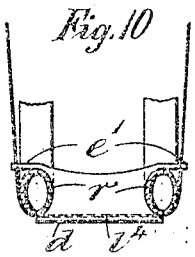 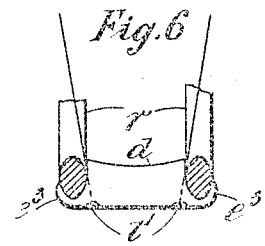
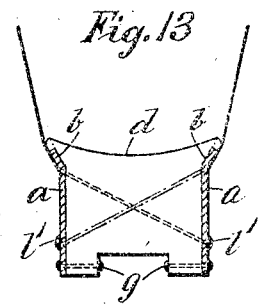 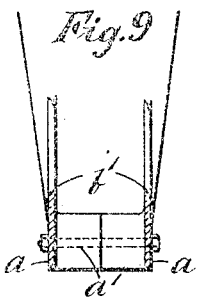 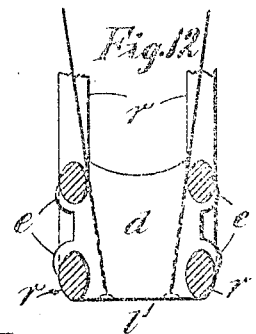

UNITED STATES PATENT OFFICE.

JOHN NEWTON BALFOUR MOORE, OF IPSWICH, ENGLAND.

WHEEL FOR CYCLES, MOTOR-CARS, CARRIAGES, AND OTHER VEHICLES.

No. 857,091.  Specification of Letters Patent.  Patented June 18, 1907.

Application filed December 21, 1905. Serial No. 292,854.

*To all whom it may concern:*

Be it known that I, JOHN NEWTON BALFOUR MOORE, a subject of the King of Great Britain, of Bourneside, Wherstead Road, Ipswich, in the county of Suffolk, England, have invented a new and useful Improvement in Wheels for Cycles, Motor-Cars, Carriages, and other Vehicles, of which the following is a specification.

My present invention relates to the wheels of cycles, motor cars, carriages, and other vehicles, and more especially to wheels provided with pneumatic tires or other devices by which elasticity and resiliency are provided between the tire where it runs on the ground and the body of the vehicle, and it has for its objects to reduce the quantity of india rubber ordinarily used, to provide a large supporting surface for the weight carried, and to obtain great elasticity and resiliency, while the wheels are simple, inexpensive and durable.

The invention is illustrated in the accompanying drawings in which:—

Figure 1 is a side elevation, partly in section of my invention. Fig. 2 is a section through the center of Fig. 1. Fig. 3 is a perspective view of one of the blocks. Fig. 4 is an end view of one of the bridge pieces. Fig. 5 is a side view thereof. Fig. 6 is a sectional view of a modification. Fig. 7 is a central cross section of a modification. Fig. 8 is a part elevation and part section of Fig. 7. Figs. 9, 10, 11, 12 and 13 are modifications.

In order to put my invention in operation (for example in a wheel having wire spokes) I take two flat rings $a$, Fig. 1, the outer diameter of which is somewhat less than that of the tread of the wheel on the ground, their breadth and thickness being sufficient to give the strength for the purpose to which they are to be applied, and I arrange these two rings parallel to each other and at a sufficient distance apart as in Fig. 2. I preferably make the inner circumference of the rings for a sufficient distance extend out laterally so that it forms a small or suitable angle $b$, Fig. 2, with a radial line continued through that part of the side ring marked $a$. Between the parallel parts of the rings I fit a series of wood blocks $c$ (Fig. 2) (or of other suitable material) which extend completely round between the two rings and can freely move radially in and out between them. These blocks are rectangular, or nearly so, as shown in Fig. 3, so that the spaces between their meeting ends are wedge-shaped and wide enough to allow for the insertion between each pair of blocks of a strong metal crosspiece $d$, Fig. 2, stamped or otherwise formed and of a shape in side view corresponding with the wedge-shaped space $d$, (Figs. 1 and 4) exactly equal to the width between the rings. These bridge-pieces (as they are termed) are firmly and strongly attached to the rings $a$ by lugs $e$ formed upon their inner, or thin, ends, (as shown in Fig. 5) at the position corresponding with that part $b$ of the rings where it inclines outward as described, these lugs extending laterally and fitting into notches or holes $f$, Fig. 1, made at regular distances apart to receive them in the outwardly inclined part $b$ of the rings $a$ and there brazed, burred down as a rivet head, or otherwise strongly fixed upon the outer side of the rings, and at the same time screws $g$ (Figs. 1 and 2) are passed through holes $h$, near the outer diameter of the rings and firmly screwed into corresponding screwed holes $j$, Fig. 4, near the outer or thick end of the bridge-piece $d$, or instead of screws, rivets or equivalent means may be used for that purpose.

Through the body of each bridge-piece a diagonal hole $k$ (Fig. 5) is made to receive the outer end $l'$ of a wire spoke $l$ (Fig. 2) which latter extends from the outer, or thick, end, of the bridge-piece and passes diagonally through it to the outside of the inner or smaller circumference of the side ring and thence inward toward the hub of the wheel. These outer ends of the wire spokes are tapered out to greater thickness than their body, or they may have suitable heads formed upon their ends, as shown, the holes through the bridge-pieces being made of corresponding shape, and the other end of the spoke is connected to the short inner part $l^2$ (which is firmly attached to the hub) by a coupling $m$, Fig. 2, having a right and left handed screw thread for the purpose of tightening up the spoke.

The wooden, or other blocks above described, the outer surfaces $c'$ of which form the tread of the wheel, have their inner parts $c^2$ widened out angularly at the sides as shown at $e'$, Fig. 3, (corresponding with the angled part $b$ of the rings $a$) to prevent them coming out from their position between the side rings when pressed by the elastic, or resilient, tire, and both their outer ends $c'$ and inner ends $c^2$, Fig. 3, are curved to the radius of the wheel.

It will be seen that the two side rings with their bridge-pieces, which separate and hold them in position, form a strong and substantial frame in which are carried and guided, so that they can move radially but cannot come out, the series of blocks which form the tread of the wheel and that this frame is rigidly connected with the hub of the wheel by its spokes on both sides.

In order to provide the necessary elastic bearing to receive the pressure of the blocks as they run upon the road I make the inner part $c^2$ of the blocks somewhat concave in transverse section and they are supported and pressed outward by a pneumatic tire or air chamber $n$, Fig. 2, of the usual kind, which is arranged inside them and against which they press. The inner circumference of the pneumatic tire is supported upon a strong circular rim $o$ of metal or wood, or both combined, resembling the ordinary rim of a cycle. When, therefore, the pneumatic tire is pumped out the inner rim serves as an abutment for it while its outer circumference presses outward with the desired force against the inner parts $c^2$ of the series of blocks $c$. The rim $o$ with its tire $n$ (or springs when such are used instead of a resilient tire), which it carries is, therefore, absolutely free from the hub $p$ and spokes $l$ of the wheel, so that the rim with the tire and tread sections $c'$ are free to move in the plane of the wheel and between the side rings and spokes attached to them, and when the wheel is in use the whole weight carried by the hub is borne more or less by that part of the pneumatic or resilient tire situated above a horizontal line drawn radially through the center of the wheel, thus affording a large resilient or elastic surface for the said weight, while the lower portion of the resilient tire at the ground tread is also compressed, giving an extra and better cushioning to the whole.

For some light vehicles, with pneumatic tires, endless side rings made of wire of suitable gage and strength may also be used, and such wire rings may be, for instance, of oval cross section as $r$ Fig. 6, and held in hook-formed lugs $e^3$ of the wedge shaped bridge-pieces $d$ to which the said rings may be fixed by brazing or equally efficient means. The spokes, which have a head $l'$ on their outer ends, pass through each bridge-piece, alternately, as shown by dotted lines, then to the inner or outer side of said rings, and finally connected to the hub by couplings $m$ or any suitable method desired.

For heavy vehicles, disk-spokes or spokes stamped from a metal plate, may be used, and they can be ribbed for strength and either made as separate parts or stamped with the side ring $a$ and central boss $p'$, Figs. 7 and 8, as one single piece of metal—one end of the hub $p$ may be suitably fixed to the one boss but the other boss $p'$ (with its attached spokes and side ring) is connected as a distinct part to allow of its being more easily removed from the hub (and opposite spokes and side ring) when required, although securely and firmly held thereto by a key, or equivalent means, when in use upon the road, and both side rings may be still further held together by transverse bolts $s$ or stays connecting a sufficient number of opposite spokes, or parts, and so made as to aid in keeping both rings at their proper distance apart, in addition to the bridge-pieces. In this figure (7) is also shown a flat $b'$ (forming a kind of offset) which allows of an extra stiffening to each ring by ribs or angle pieces $b^2$ fixed at equal intervals round and outside the rings: and in this form of my wheel the wood blocks $c$ have a corresponding plate or flat $e^2$, Fig. 7, at both their parts $e'$ intended to bear upon the side rings, in which case a piece of strong metal, similar in shape to the transverse section of said block, is firmly screwed, or otherwise fixed, to the face of each end of the latter for the purpose of both strengthening them and to act as a bearing upon the side rings. The lugs of the bridge-pieces, likewise, have horizontal flats $e^2$ which rest upon $b'$ but their outer parts $e$ pass through and are held to the outer side of notches or holes $f$ in the rings by stout pins, for example, passed through holes $t$ while the thicker end of each bridge-piece is fixed to both rings by studs or bolts $g$.

In very heavy vehicles for which an extra wide tread is required, two or more separate rims with their resilient tires placed side by side, as shown in Fig. 7, or one rim (which may be strengthened by one or more ribs around its side nearest the hub) of sufficient width to accommodate two or more resilient tires, also side by side, may be used, with concavities round the rim to retain each tire in position and the movable blocks or tread sections $c$ made of double or extra width with corresponding concavities round their inner part $c^2$. The outer part $c'$ of such tread blocks may be still further widened out by an extension or flange $v$, Fig. 7, of wood or metal, projecting on both sides but not of sufficient radial depth to prevent full play of the blocks at their part marked $w$ in the figure.

In a modification of my wheel the side rings are not partly inclined outward at their inner or smaller diameter as $b$ in Fig. 2, but are flat over their entire radial surface as $a$ Fig. 9, and made with a strong and firm bearing at $b'$ for the plate or flat $e^2$ of the tread block $c$ to rest upon. The bridge-pieces are made of similar shape to those in Fig. 7 with a flat $e^2$ also for the same purpose and the outer part $e$ passes through notches in the side rings and is secured thereto in the same way as explained above in Figs. 7 and 8, while the thicker end of each bridge-piece d is likewise securely fixed by the method already described in the same figures. Or if in this particular design of wheel, the side rings are cast, then the bridge-pieces may be made in two halves, each half (formed as a lug) cast upon the inner side of the oppositely placed side-rings. To connect these two rings a bolt $a'$ is passed through both halves (and side rings) all round the wheel, thus coupling them as one complete bridge-piece, and this is in addition to the usual hub connection. The spokes may be solid, hollow, or tubular, and cast, bolted, or otherwise fixed to their proper side ring $a$ and boss $p'$ as desired.

Fig. 10 shows another arrangement of my wheel with two wire rings $r$ of oval cross section, each resting between two lugs $e'$ on each side of the bridge-piece, $d$. The two spokes on opposite sides of the wheel are made as one piece, their part $l^4$ resting in a groove made in $d$ (as shown by dotted lines) and each spoke passes outside its own ring, through a loop or hole in lug $e$ and thence to the hub. If such rings be made of sufficiently big gage (whether solid, hollow, or tubular, or otherwise in cross section) a notch may be cut, either upon the outer side of said rings for each spoke, (where it crosses the same) to rest in, or the notch can be upon the inner side.

Fig. 11 illustrates a method for spokes passing direct through the rings $r$ and lugs $e$ in which case each spoke has a head $l'$ formed upon it.

In Fig. 12 the wheel is shown with four side rings $r$ arranged two on each side of the bridge-piece $d$. The spokes pass through the latter direct and to either side of, or through, the two rings if of smaller diameter.

Fig. 13 shows an arrangement for holding both side-rings $a$ (of the flat plate type in Fig. 2) to the bridge-piece $d$ by rivets $g$ and made still more secure by alternate spokes, on opposite sides of the wheel, being extended to the outer side of the ring as shown, and each spoke held by its head $l'$.

Although in the above description I have chiefly referred to pneumatic (double and single tube) and continuous solid-tires, it will be understood that I may use in my wheel solid tires, in sections, of suitable length, and also cushion tires. Springs, too, preferably of the spiral form, with one end connected to the rim and its other to the tread block, can be adapted to my wheels for some form of vehicles, instead of the resilient tires above mentioned and each wood block may be contained in a metal frame or sheath provided with side projections or flanges conforming, or approximately so, to those of the said blocks or treads made entirely of metal and hollow may be advisable in some cases, and the surface of such, which is in contact with the ground, is perforated in order to increase its grip upon the ground.

The details of construction of my improved wheel may be varied to suit varying circumstances.

Having fully described my invention, what I desire to claim, and secure by Letters Patent, is:—

1. The improved wheel for cycles, motor carriages and other vehicles constructed with two flat rings $a$ parallel to each other and having their parallel ends formed to receive blocks $c$, metal bridge pieces $d$ being fitted between the blocks and attached to the rings $a$ by lugs $e$ fitting into notches $f$ and screws $g$, spokes $l$ attached at one end to the bridge pieces and at the other end to the hub of the wheel with the intervention of the couplings $m$, the inner pneumatic tire $n$ supported upon the circular rim $o$ and pressing upon the inner concave shaped parts of the blocks $c$, substantially as described and shown in the drawings.

2. A wheel for cycles and the like comprising parallel rings, blocks movably held between the said rings, bridge pieces fitted between the blocks and connected to the rings, a resilient tire pressing upon the inner ends of the blocks, a circular rim surrounding the inner circumference of said tire and spokes connecting the hub of the wheel to the rings and bridge pieces said circular rim being independent of the spokes and hub.

In witness whereof I have hereunto set my hand in the presence of two witnesses.

JOHN NEWTON BALFOUR MOORE.

Witnesses:
ARTHUR E. EDWARDS,
DOROTHY K. BOYLE.